United States Patent [19]
Kwon et al.

[11] Patent Number: 5,609,096
[45] Date of Patent: Mar. 11, 1997

[54] VEGETABLE FRESHNESS KEEPING DEVICE HAVING A SENSOR

[75] Inventors: Chul H. Kwon, Seoul; Hyung-Ki Hong, Kyungki-Do; Sung T. Kim, Seoul; Kyu C. Lee, Seoul; Dong H. Yun, Kyungki-Do; Hyun W. Shin, Kyungki-Do; Hyeon S. Park, Seoul, all of Rep. of Korea

[73] Assignee: Goldstar Co., Ltd., Seoul, Rep. of Korea

[21] Appl. No.: 356,546

[22] Filed: Dec. 15, 1994

[30]    Foreign Application Priority Data

Dec. 17, 1993 [KR] Rep. of Korea ............... 28309/1993
Oct. 18, 1994 [KR] Rep. of Korea ............... 26614/1994

[51] Int. Cl.$^6$ ........................... A01F 25/00; F25B 41/00
[52] U.S. Cl. ................ 99/468; 99/325; 99/486; 435/289.1; 435/291.1
[58] Field of Search .............. 99/325–331, 467–470, 99/473–476, 483, 451, 485, 486; 426/237, 238, 521; 364/400, 477, 478; 395/82; 219/483; 392/498; 435/286.6, 303.1, 813, 819, 289–291

[56]    References Cited

U.S. PATENT DOCUMENTS

| | | | |
|---|---|---|---|
| 4,695,472 | 9/1987 | Dunn et al. | 426/237 |
| 4,838,154 | 6/1989 | Dunn et al. | 99/483 X |
| 5,048,404 | 9/1991 | Bushnell et al. | 99/451 |
| 5,172,328 | 12/1992 | Cahlander et al. | 99/325 |
| 5,235,905 | 8/1993 | Bushnell et al. | 99/451 |
| 5,375,508 | 12/1994 | Knepler et al. | 219/483 X |
| 5,424,210 | 6/1995 | Bae et al. | 99/468 X |
| 5,442,994 | 8/1995 | Parker | 99/468 |
| 5,448,186 | 10/1995 | Lee et al. | 99/486 X |

*Primary Examiner*—Timothy F. Simone

[57]    ABSTRACT

A vegetable freshness sensor production method and a freshness keeping device using the sensor are disclosed. The sensor senses gases generated by vegetables, thus to not only sense freshness of the vegetables but also sense decayed state of the vegetables. The vegetable freshness keeping device appropriately controls temperature, pressure, humidity, $O_2/CO_2$ and quantity of anion in the vegetable store room in accordance with sensing result of the sensor, thus to keep freshness of the vegetables for a long time. In order to produce the gas sensor, a mixture of a metal catalyst and a sensing material is calcinated and mixed with an organic vehicle, thus to form a paste. The paste is coated on an electrode surface of an alumina substrate, thus to form a sensing layer on the substrate. The substrate, after being sintered, is subjected to a wire bonding and to a packaging, thus to form the gas sensor.

8 Claims, 9 Drawing Sheets

| SENSOR MATERIAL | EFFECT | MAX SENSITIVITY |
|---|---|---|
| $TiO_2$ | | 30 ~ 90 |
| $0.5Ru/TiO_2$ | PROMINENTLY IMPROVED | 250 ~ 560 |
| $2.0In/TiO_2$ | PROMINENTLY IMPROVED | 290 ~ 490 |
| $0.5Au/TiO_2$ | PROMINENTLY IMPROVED | 145 ~ 170 |
| $0.5Pt/TiO_2$ | REDUCED | 9 ~ 26 |
| $1.5Pd/TiO_2$ | PROMINENTLY REDUCED | 9 |
| $1.5Rh/TiO_2$ | PROMINENTLY REDUCED | 3.5 |

VEGETABLE FRESHNESS KEEPING DEVICE HAVING A SENSOR

BACKGROUND OF THE INVENTION

1. Field of the Invention

The present invention relates in general to sensing and keeping of freshness of vegetables and, more particularly, to a method for producing a vegetable freshness sensor or a gas sensor suitable for sensing gases generated by vegetables and sensing freshness of the vegetables and to a vegetable freshness keeping device using such a gas sensor suitable for automatically appropriately controlling the conditions of a vegetable store room in accordance with vegetable freshness sensing result of the gas sensor and keeping the freshness of vegetables for a long time.

2. Description of the Prior Art

Generally, freshness of food has been subjectively discriminated by the senses of the human being, such as the sense of sight, the sense of taste and the sense of smell, so that the discrimination of the food freshness using the senses may be indefinite. In an effort to overcome indefiniteness of discrimination of the food freshness using the senses, freshness sensing technique using a semiconductor gas sensor has been studied. In recent, there has been proposed a semiconductor gas sensor suitable for sensing trimethylamine (TMA) that is a typical component of odor generated by a fish.

With reference to FIG. 1, there is shown a typical semiconductor gas sensor suitable for sensing TMA. In this drawing, the reference numeral 1 is an insulating ceramic tube 1 which is coated with a metal electrode wire 2. The ceramic tube 1 in turn is coated with a sensing material 3 on the electrode wire 2. Axially extending through the ceramic tube 1 is a heater 4 for appropriately controlling the inner temperature of the tube 1. Representative example of the sensing material 3 suitable for sensing TMA is semiconducting oxide of titanium dioxide ($TiO_2$). When using the titanium dioxide ($TiO_2$) as the sensing material, the titanium dioxide ($TiO_2$) is added with a metal catalyst so as to improve sensitivity of a resulting gas sensor. The basic factors influencing the sensitivity of the resulting gas sensor are catalytic activity and sensing film thickness. In order to improve the sensitivity of the gas sensor, it is very important to determine the quantity of used metal catalyst as well as the kind of used metal catalyst.

Abstract of prior researches of metal catalysts added to the titanium dioxide ($TiO_2$) is shown in FIG. 2. FIG. 2 is a table showing expected effects and expected maximum sensitivities of resulting gas sensors in accordance with kinds of metal catalysts and quantities of metal catalysts added to the titanium dioxide ($TiO_2$). The maximum sensitivities of the gas sensors are calculated through the equation R(air)/R(gas), wherein R(air) is a resistance of the sensor in air, while R(gas) is a resistance of the sensor in air laden with 300 ppm of TMA. As shown in the table of FIG. 2, it is noted that the metal catalysts such as ruthenium (Ru), indium (In) and gold (Ag) remarkably improve the sensitivity of the gas sensor for TMA.

It should be understood that there may exist gas sensors having other sensing materials besides titanium dioxide ($TiO_2$) for sensing TMA. For example, $In_2O_3$—MgO (5 mol %) may be used as sensing material of the TMA gas sensor. That is, when adding 5 mol % of MgO is added to $In_2O_3$, the electron concentration is reduced due to valency control, so that the sensor resistance in air is increased. When the sensor resistance in air reaches a given level, the sensitivity of the TMA gas sensor is improved.

However, the above researches are not practically used in industrial field but is still in an early stage. Furthermore, the gas sensor of FIG. 1 not only wastes electric power but also is not suitable for produced through an automated production process, so that the gas sensor has a problem that it can not be produced through mass production. Particularly, sensors for freshness of vegetables, which sensors are connected to this invention, should be particularly sensitive to gaseous sulfides generated by vegetables, so that such sensors should be produced through a specified process different from that of the above TMA gas sensors.

SUMMARY OF THE INVENTION

It is, therefore, an object of the present invention to provide a method for producing a gas sensor for sensing freshness of food, particularly, of vegetables, by sensing gas generated by the vegetables and to provide a freshness keeping device using such a gas sensor suitable for automatically controlling the conditions of a vegetable store room in accordance with freshness of the vegetables sensed by the gas sensor and for keeping the freshness of the vegetables for a long time.

In an aspect, the present invention provides a method for producing vegetable freshness sensor comprising the steps of: adding a predetermined amount of palladium powder to a stannic oxide powder and sufficiently mixing the palladium powder and the stannic oxide powder with each other so as to form a mixture, and grinding the mixture; calcinating the mixture for a predetermined time at a predetermined temperature and mixing the mixture with an organic vehicle, thus to form a paste; coating the paste on an electrode surface of a substrate, thus to form a sensing layer of an appropriate size and of an appropriate thickness on the electrode surface; and drying the substrate coated with the sensing layer and sintering the substrate for a predetermined time at a predetermined temperature and bonding a lead wire to the electrode surface and packaging the substrate.

In another aspect, the present invention provides a device for keeping freshness of a vegetable comprising: means for sensing the freshness of the vegetable, the freshness sensing means sensing both component and concentration of a gas generated by the vegetable and converting sensing result into an electric signal and outputting the electric signal to a microprocessor; the microprocessor receiving the electric signal from the freshness sensing means and discriminating conditions of the vegetable and outputting a control signal in accordance with vegetable condition discriminating result; and means for keeping the freshness of the vegetable, the freshness keeping means receiving the control signal from the microprocessor and controlling a predetermined factor for keeping the freshness of the vegetable.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figures 1, 2:
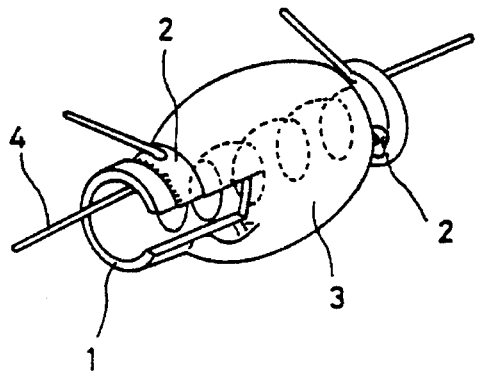
FIG. 1 is a perspective view showing a construction of a typical fish freshness sensor.
FIG. 2 is a table showing expected effect and expected maximum sensitivities of typical fish freshness sensors in accordance with kinds and quantities of metal catalysts added to titanium dioxide ($TiO_2$)
Figure 3:
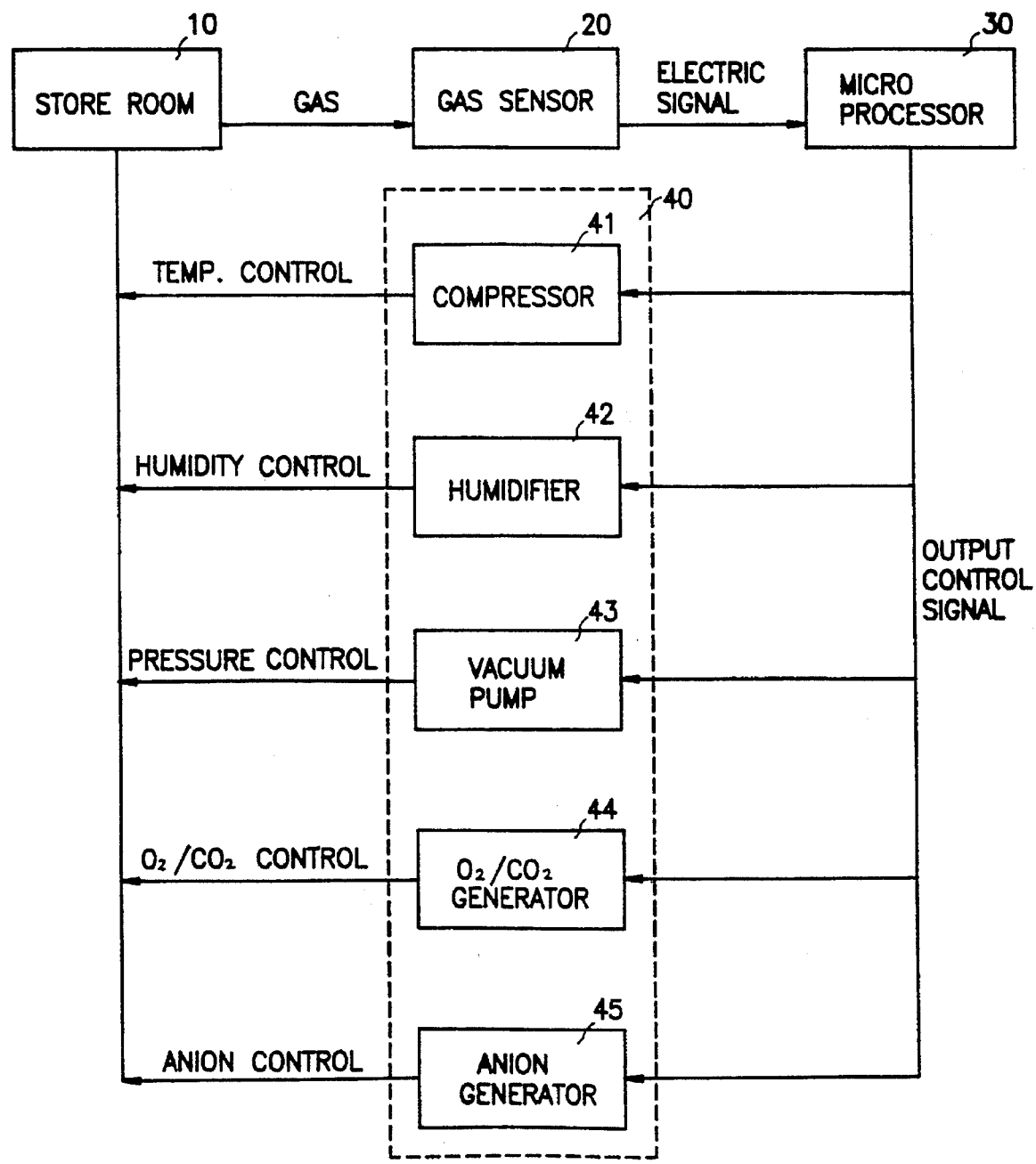
FIG. 3 is a block diagram showing a construction of a vegetable freshness keeping device of the invention.

With reference to FIG. 3, there is shown in a block diagram a construction of a vegetable freshness keeping device of the invention. As shown in this drawing, the freshness keeping device has a vegetable store room 10 for storing a vegetable therein. A gas sensor 20 is mounted to a predetermined position of the interior of the store room 10. The gas sensor 20 senses component and concentration of a gas generated by the vegetable stored in the store room 10 and outputs electric signal indicative of the sensed gas component and of the sensed gas concentration to a microprocessor 30. The microprocessor 30 determines conditions of the vegetable stored in the store room 10 in accordance with the signal applied from the gas sensor 20 and outputs control signals to a control unit 40 for controlling the conditions of the store room 10 in accordance with the sensed vegetable conditions. Upon reception of the control signals of the microprocessor 30, the control unit 40 controls temperature, humidity, pressure, $O_2$ and $CO_2$, and the quantity of anion in the store room 10, thus to keep desirable conditions of the store room 10 suitable for keeping freshness of the vegetables for a long time.

Hereinbelow, the operational effect of the above vegetable freshness keeping device will be described.

The vegetable stored in the store room 10 generates reduction gases such as gaseous sulfides, for example, hydrogen sulfide $H_2S$, methyl mercaptan $CH_3SH$, dimethylsulfide $(CH_3)_2S$ and dimethyldisulfide $(CH_3)_2S_2$, with the lapse of time. The above gaseous sulfides are bonded to oxygen ions absorbed on the surface of the gas sensor 20, thus to generate conductive electrons as represented by the following reaction formula and to change the electric conductivity of the sensor surface.

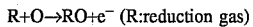

$$R+O \rightarrow RO+e^- \quad (R:\text{reduction gas})$$

The above reaction most actively happens about the metal catalyst on the sensor surface, so that the kind of used metal catalyst as well as the quantity of the used metal catalyst is very important factor of determination of sensitivity of the sensor. In the gas sensor produced through a sensor production method in accordance with a first embodiment of the invention, about 0.1–10 wt % of palladium catalyst is added to stannic oxide $SnO_2$ that is a sensing material.

Figure 4:
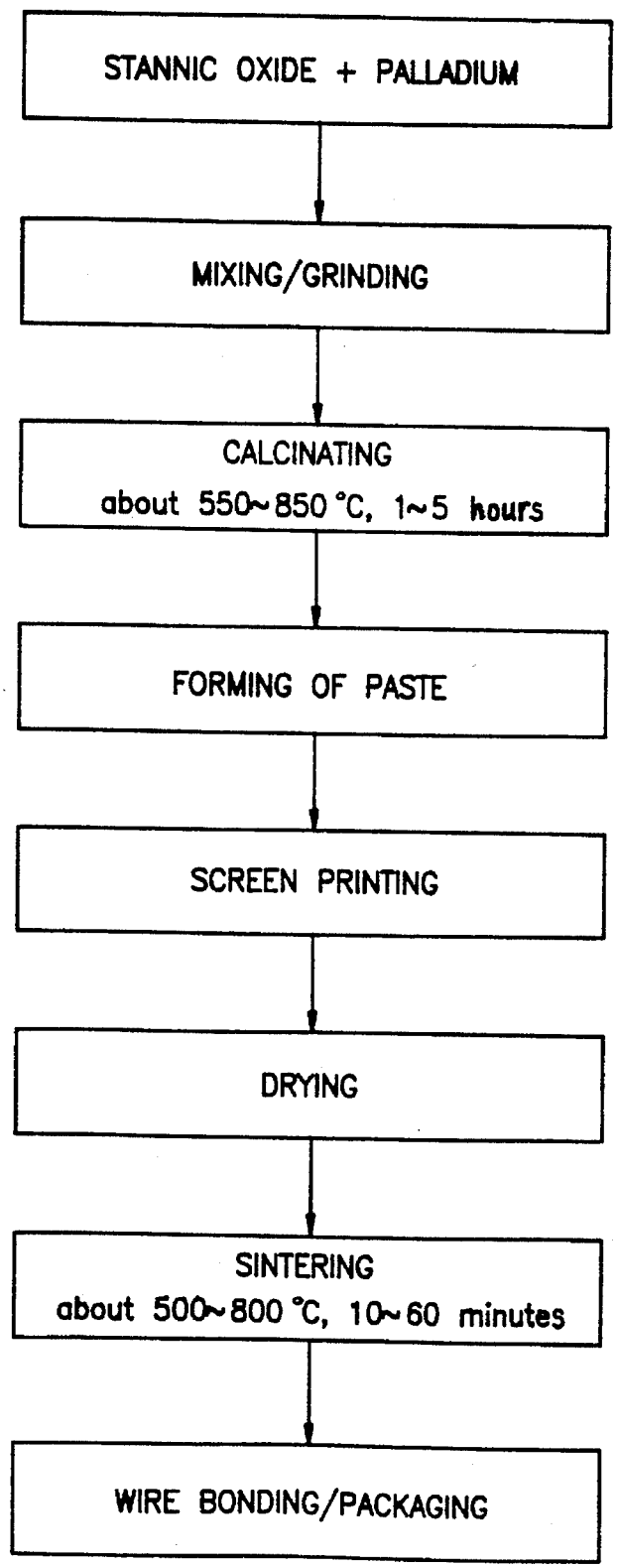
FIG. 4 is a block diagram showing a process for producing a vegetable freshness sensor in accordance with the invention.

FIG. 4 is a block diagram showing the process for producing the above gas sensor 20 of the first embodiment of the invention.

As shown in this drawing, stannic oxide ($SnO_2$) powder and about 0.1–10 wt % of palladium (Pd) catalyst powder are sufficiently mixed to each other and ground into micro powder. The powder mixture is, thereafter, calcinated for about 1–5 hours at about 550°–850° C. temperature. The calcinated powder is again ground and in turn mixed with organic vehicle comprising ethylcellulose and α-terpineol, thus to form paste. Thereafter, the paste is coated, through a screen printing, on an electrode surface of an alumina substrate provided with an electrode and a predetermined shape of heater, thus to form a coating layer having both an appropriate size and an appropriate thickness. The screen printing step is followed by a drying step. After the drying step, the substrate coated with the paste is sintered for about 10–60 minutes at about 500°–800° C. temperature. The substrate after the sintering is subjected to wire bonding wherein a lead wire is bonded to the electrode and subjected to packaging wherein the substrate is packaged, thereby forming the desired gas sensor. In the above sensor production process, it is preferred to use platinum (Pt) or gold (Au) as material of the electrode and of the heater of the substrate. In addition, it is preferred to let the alumina substrate have thin thickness and small area as the thin and small substrate reduces waste of electric power. In the present invention, it is allowable to use platinum (Pt), gold (Au) or silver (Ag) as the lead wire. However, it is preferred to use a thin lead wire since the thin lead wire is more profitable in view of waste of power.

Figure 5:
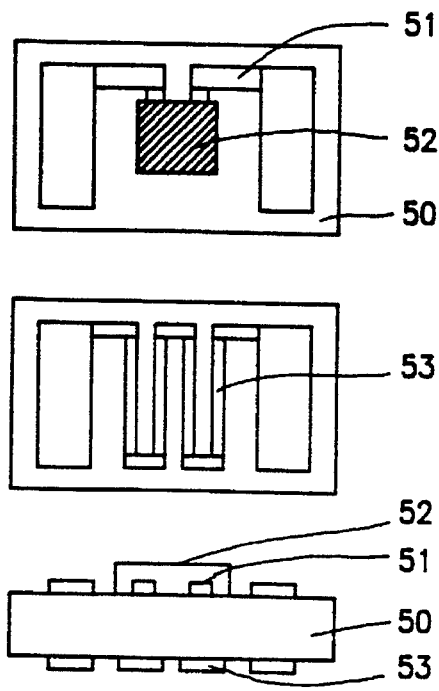
FIG. 5 is a view showing a construction of the vegetable freshness sensor of the invention.

As shown in FIG. 5 showing a construction of the gas sensor 20, the ceramic substrate 50 of the gas sensor 20 is provided on its front surface with both the electrode 51 and a sensing layer 51, the sensing layer 51 being formed on the electrode 51 and having a predetermined area and a predetermined thickness. The back surface of the substrate 50 is provided with the predetermined shape of heater 53.

Figure 6:
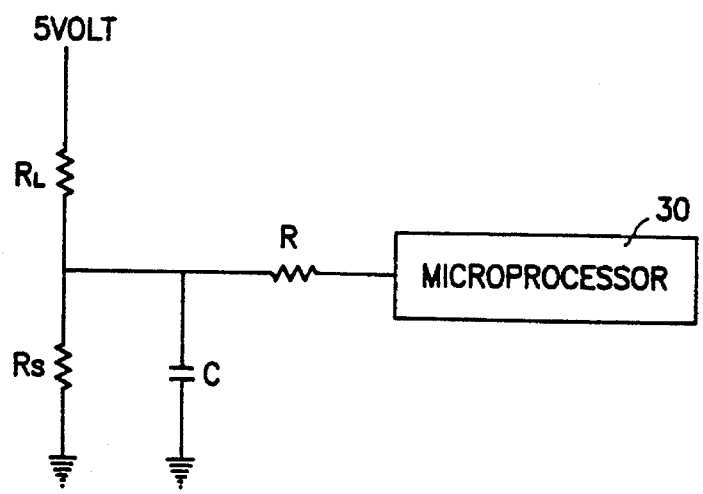
FIG. 6 is a circuit diagram of the vegetable freshness sensor of the invention for sensing gas generated by vegetables and converting the sensing result into an electric signal and outputting the electric signal to a microprocessor.

FIG. 6 is a circuit diagram of the gas sensor 20 for sensing the gas generated by the vegetable and for converting the sensing result into an electric signal, and for outputting the electric signal to the microprocessor 30. In the circuit diagram of FIG. 6, the resistor Rs is a resistor of a sensor device, while the resistor $R_L$ is a fixed resistor. The sensor device resistor Rs and the fixed resistor $R_L$ are coupled to each other in a series. One end of the fixed resistor $R_L$ is coupled to a voltage terminal, while the sensor device resistor Rs is grounded. The gas sensor 20 reacts with the gas generated by the vegetable, thus to vary in its resistance. At this time, the resistance variation of the sensor device resistor Rs appears in the form of voltage variation in accordance with resistance division ratio of the sensor device resistor Rs to the fixed resistor $R_L$. The resistance variation of the sensor device resistor Rs in turn is stored in a capacitor C, which capacitor C is coupled to the sensor device resistor Rs in parallel. The resistance variation of the sensor device resistor Rs stored in the capacitor C is, thereafter, outputted from the resistor R to the microprocessor 30.

Figure 7:
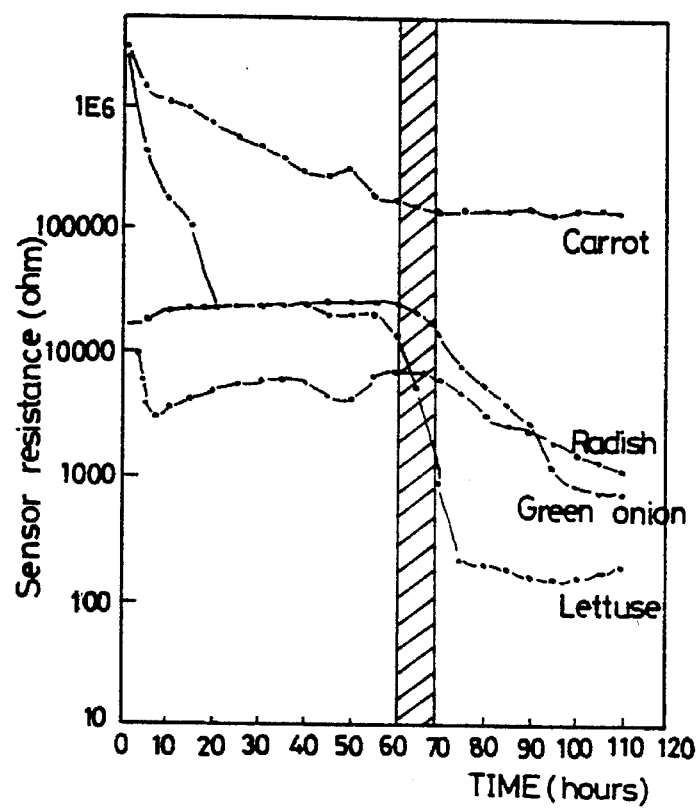
FIG. 7 is a graph showing vegetable freshness sensing results of a gas sensor produced through a sensor production method in accordance with a first embodiment of the invention.

FIG. 7 is a graph showing resistance variations of the gas sensor 20, which sensor 20 was produced through the sensor production method according to the first embodiment of the invention, when the sensor 20 senses gases generated by varieties of vegetables with the lapse of time at the normal temperature 25° C. That is, the graph of FIG. 7 shows resistance variations of the gas sensor 20 in accordance with the quantities of gases generated by vegetables, that is, radish, green onion, carrot and lettuce. As shown in the graph, as the quantity of gas generated by a vegetable is reduced with the lapse of time, the resistance of the sensor 20 is reduced. Particularly, reduction of resistances of the sensor 20 is prominent after lapse of about 60–70 hours and this time will be recognized as decay start points of the vegetables. However, varieties of vegetables include different components, so that the decay start points of the vegetables will slightly differ from each other.

A resistance variation is converted into a voltage variation and applied to the microprocessor 30 in the form of voltage signal. Upon reception of the voltage signal from the sensor 20, the microprocessor 30 compares the input voltage with a programmed voltage so as to discriminate freshness of a vegetable stored in the store room 10. After the discrimination of the freshness of the vegetable, the microprocessor 30 outputs control signals to the control unit 40, thus to control the inner temperature of the store room 10 by a compressor 41, to control the humidity of the store room 10 by a humidifier 42, to control the pressure of the store room 10 by a vacuum pump 43, to control supply of $O_2$ and $CO_2$ for the store room 10 by a $O_2/CO_2$ generator 44 and to control the quantity of anion of the store room 10 by an anion generator 45. Therefore, the vegetable freshness keeping device of the invention keeps the freshness of the vegetable stored in the store room 10.

Figure 8:
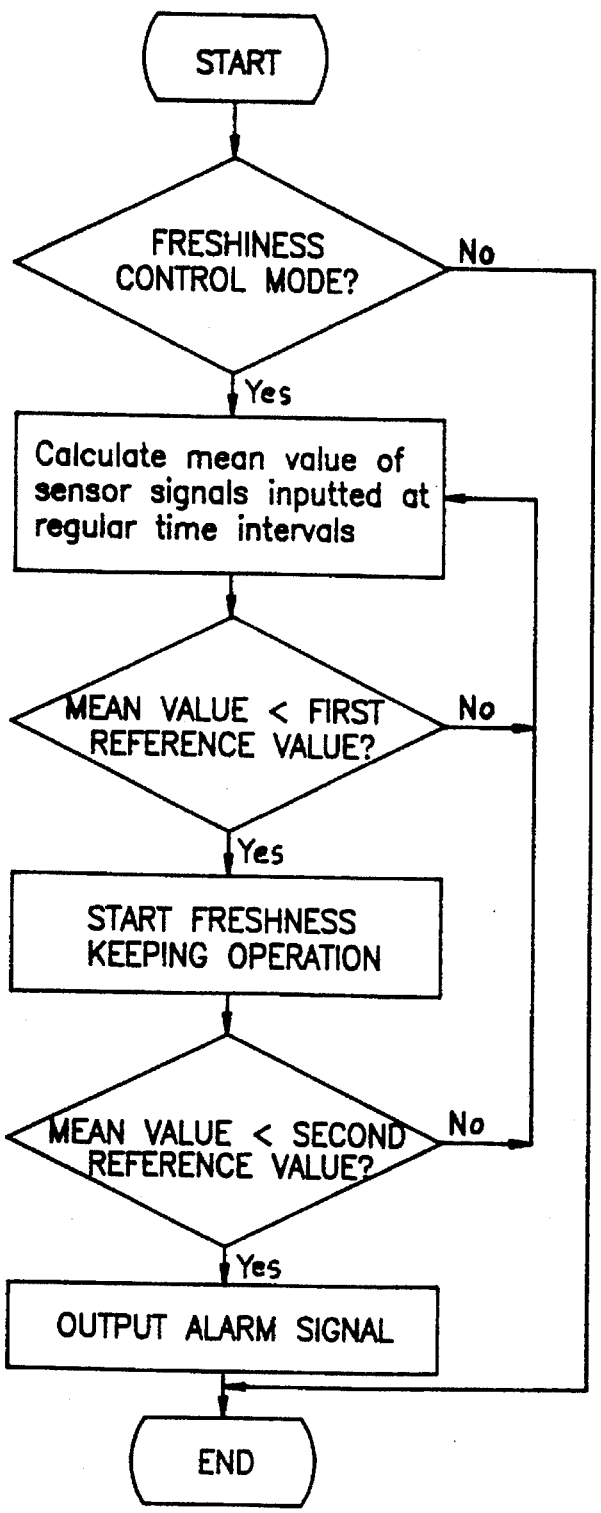
FIG. 8 is a flowchart of a vegetable freshness keeping process of the vegetable freshness keeping device of FIG. 3.

The above vegetable freshness keeping operation of the vegetable freshness keeping device is described in detail in a flowchart of FIG. 8. As represented in the flowchart, the microprocessor 30 primarily determines whether the input operational mode is a vegetable freshness control mode. When the input operational mode is the vegetable freshness control mode, the microprocessor receives the signals from the gas sensor 20 at regular time intervals and takes the mean of the input signals, thus to calculate the mean value. Thereafter, the microprocessor 30 compares the mean value with a first reference value. When the mean value is not higher than the first reference value, the microprocessor 30 carries out the above-mentioned freshness keeping operation. However, when the mean value is higher than the first reference value, the microprocessor 30 determines that the vegetables stored in the store room 10 still keep its freshness, so that the microprocessor 30 repeatedly receives the signals from the gas sensor 20 at regular time intervals and takes the mean of the input signals and compares the mean value with the first reference value.

Here, the first reference value that was experimentally determined and programmed in the microprocessor 30 is a value representing the point of start of the freshness keeping operation of the device. The quantities of gases generated by the vegetables are reduced with the lapse of time and, as a result, the input values applied from the sensor 20 to the microprocessor 30 are reduced with the lapse of time shown in the graph of FIG. 7. Therefore, when the mean value is higher than the first reference value, the microprocessor 30 determines that a vegetable stored in the store room 10 still keep its freshness.

After carrying out the freshness keeping operation, the microprocessor 30 receives the signals from the gas sensor 20 at regular time intervals and takes the mean of the input signals, thus to calculate mean value. The microprocessor 30, thereafter, compares the mean value with a second reference value. Here, the second reference value is a value representing the point of determining that a vegetable has been decayed. When the mean value is higher than the second reference value, the microprocessor 30 repeatedly receives the signals from the gas sensor 20 at regular time intervals and takes the mean of the input signals and compares the mean value with the second reference value. However, when the mean value is not higher than the second reference value, the microprocessor 30 lets an alarm signal be generated and alarms a user of decay of the vegetable and stops the operation of the freshness keeping device.

The above description is for sensing and keeping the freshness of a vegetable, however, the store room 10 of the vegetable freshness keeping device may generally store varieties of vegetables at a time. When the store room 10 stores varieties of vegetables therein at a time, the freshness of the vegetables may be discriminated by processing, through pattern recognition and neural network, the signals outputted from a plurality of different gas sensors. However, this device using the plurality of gas sensors will increase the cost.

However, the cost may be reduced by using an array gas sensor instead of the plurality of gas sensors.

Figure 9:
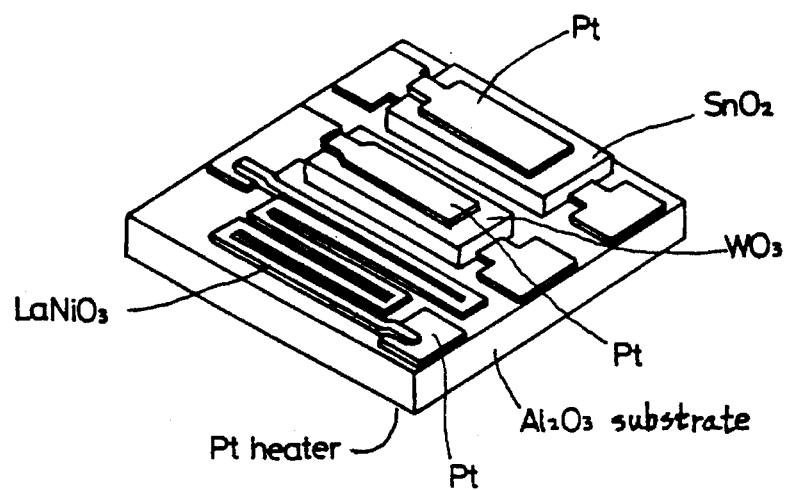
FIG. 9 is a perspective view showing a construction of an array gas sensor having two sensing layers in accordance with another embodiment of the invention.

FIG. 9 is a perspective view showing a construction of an array gas sensor having two sensing layers in accordance with an embodiment of the invention. As shown in this drawing, the array gas sensor includes a first sensing layer made of $SnO_2$ and a second sensing layer made of $WO_3$, which first and second sensing layers are arrayed in parallel on predetermined positions of a substrate made of $Al_2O_3$. A top electrode made of Pt is arrayed on each of the first and second sensing layers.

Figure 10:
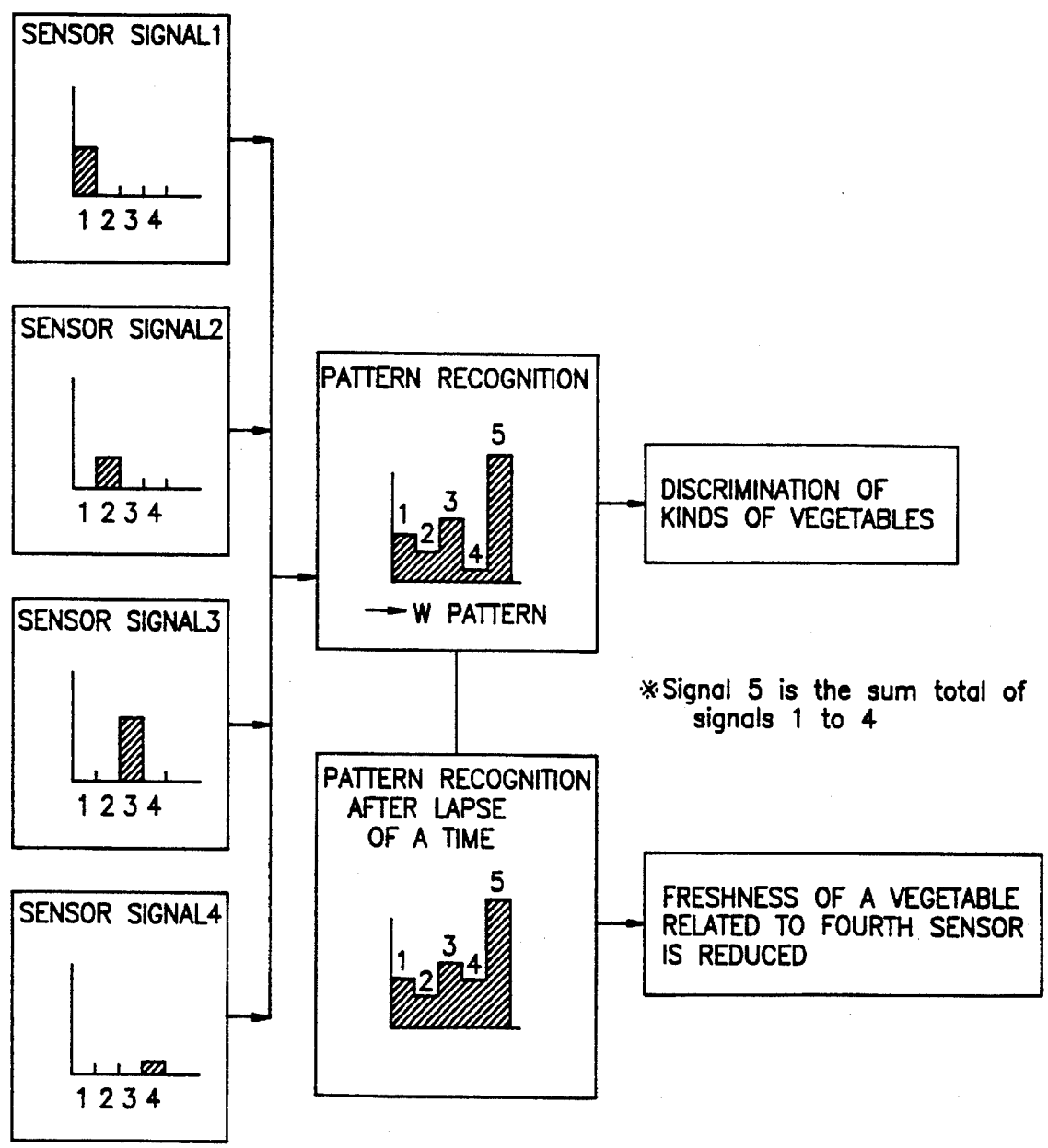
FIG. 10 is a block diagram showing a vegetable freshness discrimination process of an array gas sensor having four sensing layers in accordance with still another embodiment of the invention.

FIG. 10 is a block diagram showing a vegetable freshness discrimination process of an array gas sensor having four sensing layers in accordance with another embodiment of the invention. As represented in this drawing, the sensor signals or the output signals from the first to fourth gas sensors are primarily patterned into predetermined patterns respectively, so that the sensor signals are recognized and various kinds of vegetables stored in the store room 10 are discriminated. In the recognized pattern in the diagram of FIG. 10, the numbers 1 to 4 denote the sensor signals outputted from the first to fourth gas sensors respectively, while the number 5 denotes the sum total of the sensor signals 1 to 4. When a predetermined time has been elapsed after the pattern recognition for discrimination of the kinds of vegetables, the sensor signals are again patterned and, thereafter, the patterned sensor signals are compared with the previous patterned sensor signals. As a result of comparison of the patterned sensor signals, it is noted that the sensor signal 4 from the fourth sensor prominently differs from the previous sensor signal 4. This means that the amount of gas component sensed by the fourth gas sensor is prominently reduced. As the kinds of vegetables related to the first to fourth gas sensors are different from each other as described above, the array gas sensor having four sensing layers individually discriminates freshness of a specified vegetable in accordance with variation of sensor signal pattern.

In the present invention, the freshness of the vegetables stored in the store room 10 may be discriminated using a gas sensor having a characteristic different from that of the above-mentioned gas sensor. Such a gas sensor is produced through a sensor production method according to a second embodiment of the present invention. That is, the sensor production method of the second embodiment of the invention produces a gas sensor by adding about 5–15 wt % of zinc sulfide (ZnS) powder to either stannic oxide $SnO_2$ or zinc oxide ZnO, thus to prepare a mixture, and by processing the mixture through the process of FIG. 4.

Thereafter, the sensing layer made of sensing material $SnO_2$—ZnS or ZnO—ZnS is subjected to burning, so that most of zinc sulfide (ZnS) is oxidized, while zinc oxide (ZnO) is evenly distributed on all over the sensing layers. The zinc oxide (ZnO) increases reactivity of the gas sensor for gaseous sulfides.

Figure 11:
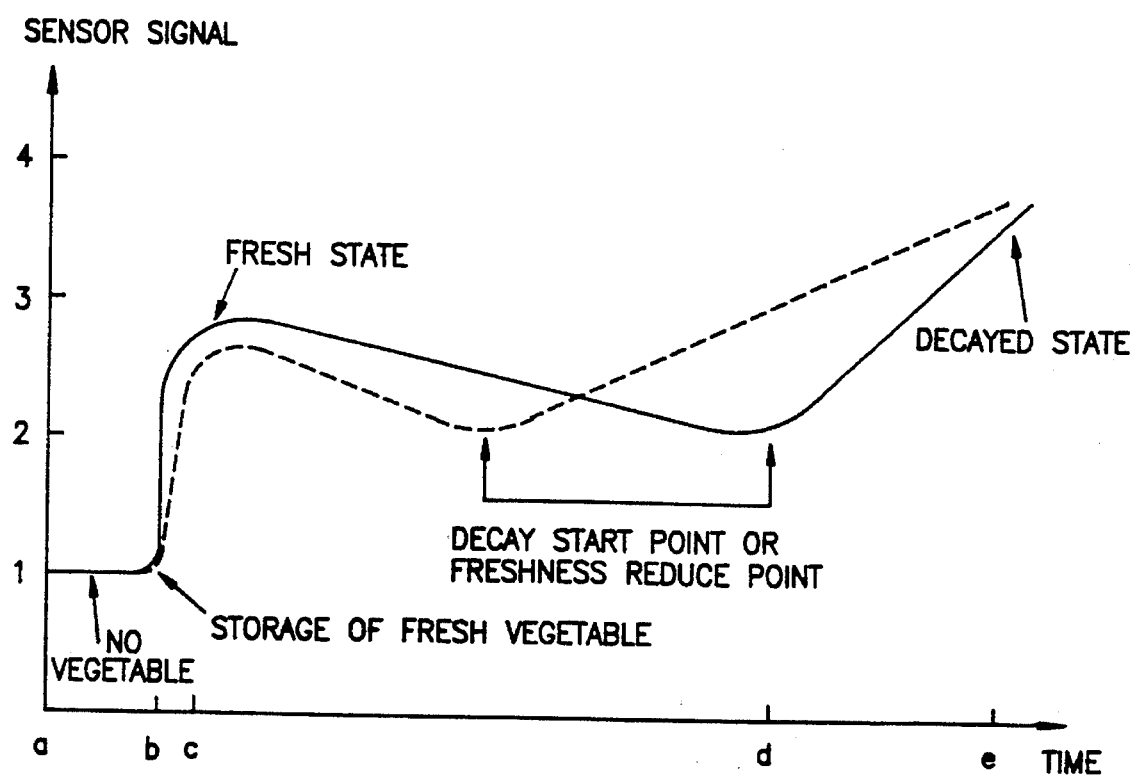
FIG. 11 is a graph showing vegetable freshness sensing results of a gas sensor produced through a sensor production method in accordance with a second embodiment of the invention.

FIG. 11 is a graph showing vegetable freshness sensing results of the gas sensor produced through the sensor production method of the second embodiment of the invention. In the graph of FIG. 11, the solid characteristic curve shows freshness sensing characteristics outputted from the gas sensor with the lapse of time at peripheral temperature of about 5°–10° C. As represented by the solid characteristic curve, the gas sensor outputs a constant signal when no vegetable is stored in the store room 10. When a fresh vegetable is stored in the store room 10, the fresh vegetable generates a fresh smell component (a gaseous sulfide), thus to cause resistance variation of the gas sensor and to cause prominent variation of the output voltage of the sensor. The freshness of the vegetable is gradually reduced with the lapse of time, so that the fresh smell component (the gaseous sulfide) generated by the vegetable is gradually reduced. Therefore, the sensor signal level is gradually reduced with the lapse of time. When the freshness of the vegetable is continuously reduced, the vegetable will be decayed and generates another gaseous sulfide different from the gaseous sulfide of the fresh smell component. Therefore, the sensor signal value is abruptly increased. As represented by the dotted characteristic curve of the graph of FIG. 11, the freshness sensing characteristics outputted from the gas sensor may differ from the above-mentioned characteristics represented by the solid characteristic curve in accordance with a kind of the stored vegetable and initial state of the vegetable when initially stored in the store room 10. However, it is noted that freshness sensing characteristics of the gas sensor vary in similar type regardless of kinds of vegetables stored in the store room 10.

Figure 12:
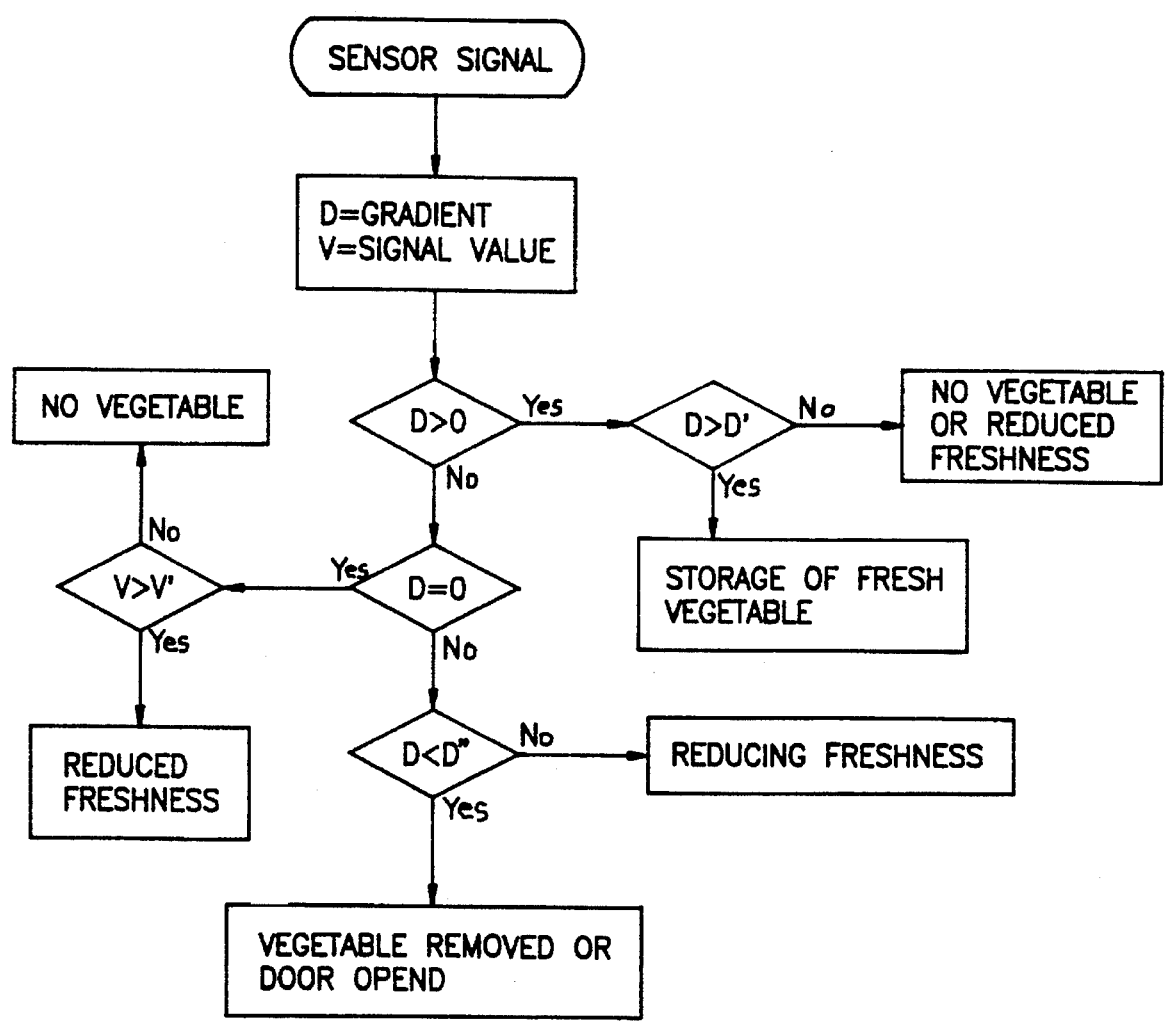
FIG. 12 is a flowchart of a vegetable freshness discrimination process of the vegetable freshness keeping device having the gas sensor produced through the sensor production method of the second embodiment of the invention.

As described above, the gas sensor produced through the sensor production method of the second embodiment of the invention not only senses freshness of vegetables but also senses decayed states of the vegetables. FIG. 12 is a flowchart of a vegetable freshness keeping process of a vegetable freshness keeping device having the gas sensor produced through the sensor production method of the second embodiment of the invention. As represented in this flowchart, when letting the signal value outputted from the gas sensor be V and letting the gradient of the sensor signal or the output signal of the sensor be "D", the microprocessor calculates the gradient D of the input sensor signal and determines whether the gradient D is higher than zero.

When the gradient D of the sensor signal is higher than zero, the vegetable condition in this case is included in either the region b-c or the region d-e of the graph of FIG. 11. The gradient D of the sensor signal in the region b-c is remarkably higher than that of the sensor signal in the region d-e. Here, please let a predetermined gradient, which gradient is lower than the gradient in the region b-c but higher than the gradient in the region d-e, be D'. When the gradient D of the sensor signal is higher than the predetermined gradient D', the vegetable condition is included in the region b-c, so that the microprocessor recognizes that a fresh vegetable has been just stored. On the contrary, when the gradient D of the sensor signal is not higher than the predetermined gradient D', the vegetable condition is included in the region d-e, so that the microprocessor recognizes that the stored vegetable has been already decayed or remarkably reduced in its freshness.

In addition, when the gradient D of the sensor signal is not higher than zero, this means that the gradient D is equal to zero or lower than zero. When the gradient D of the sensor signal is zero, the vegetable condition is included in the region a-b or corresponds to the point d. The sensor signal value V in the region a-b is lower than the sensor signal value V at the point d. Here, please let a predetermined sensor signal value, which value is higher than the signal value V in the region a-b but lower than the signal value V at the point d, be V'. When the sensor signal value V is higher than the predetermined sensor signal value V', the vegetable condition corresponds to the point d, so that the microprocessor recognizes that the freshness of the stored vegetable has been reduced. On the contrary, when the sensor signal value v is not higher than the predetermined sensor signal value V' this condition is included in the region a-b, so that the microprocessor recognizes that no vegetable is stored in the store room now.

On the other hand, when the gradient D of the sensor signal is lower than zero, this condition is included in the region c-d of the graph of FIG. 11. In this case, the microprocessor determines whether the gradient D of the sensor signal is lower than a predetermined gradient D". When the gradient D of the sensor signal is not lower than the predetermined gradient D", this means that the freshness of the stored vegetable is gradually reduced as shown in the region c-d of the graph of FIG. 11. However, either when the vegetable has been removed from the store room 10 or when the door of the store room 10 is opened, the sensor signal is abruptly reduced. In this regard, when the gradient D of the sensor signal is lower than the predetermined gradient D", this means that the vegetable has been removed from the store room 10 or the door of the store room 10 is opened.

As described above, a gas sensor produced through a sensor production method of the invention senses gas generated by vegetables stored in a vegetable store room, thus to not only sense freshness of the stored vegetables but also sense decayed state of the vegetables. The present invention also provides a vegetable freshness keeping device that uses the above gas sensor and appropriately controls temperature, pressure, humidity, $O_2/CO_2$ and quantity of anion in the vegetable store room in accordance with sensing result of the gas sensor, thus to keep freshness of the vegetables for a long time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for keeping freshness of a vegetable comprising:

means for sensing the freshness of the vegetable, said freshness sensing means sensing both component and concentration of a gas generated by the vegetable and converting sensing result into an electric signal and outputting said electric signal to a microprocessor;

the microprocessor receiving the electric signal from the freshness sensing means and discriminating conditions of the vegetable and outputting a control signal in accordance with vegetable condition discriminating result; and means for keeping the freshness of the vegetable, said freshness keeping means receiving the control signal from said microprocessor and controlling a predetermined factor for keeping the freshness of the vegetable.

2. The freshness keeping device according to claim 1, wherein said predetermined factor for keeping the freshness of the vegetable is at least one of temperature, humidity, pressure, $O_2$ and $CO_2$, the quantity of anion, and the quantity of ozone.

3. The freshness keeping device according to claim 1, wherein said freshness sensing means is a gas sensor.

4. The freshness keeping device according to claim 3, wherein said gas sensor comprises:

a ceramic substrate;

a predetermined shape of electrode provided on a front surface of said substrate;

predetermined area and thickness of sensing layer formed on said electrode; and a heater provided on a back surface of the substrate.

5. The freshness keeping device according to claim 4, wherein said gas sensor is an array gas sensor having at least two sensing layers.

6. The freshness keeping device according to claim 1, wherein said microprocessor recognizes a point of time, at which point the vegetable starts to decay, in accordance with the electric signal from said freshness sensing means.

7. The freshness keeping device according to claim 1, wherein said microprocessor recognizes a point of time, at which the vegetable still keeps the freshness, and a point of time, at which the vegetable starts to decay, in accordance with the electric signal from said freshness sensing means.

8. The freshness keeping device according to claim 5, wherein said microprocessor is applied with a plurality of electric signals, related to specified gases, from said array gas sensor and patterns the electric signals into predetermined patterns and recognizes the signal patterns and discriminates the kind of stored vegetable in accordance with pattern recognition and recognizes variation of the signal patterns with lapse of time, and discriminates freshness of a specified vegetable.

* * * * *